United States Patent Office 2,927,916
Patented Mar. 8, 1960

2,927,916

PROCESS FOR PREPARING CASEIN WITH LOW VISCOSITY AND HIGH ADHESIVE STRENGTH

Edward R. Magariello, Islip, N.Y., assignor to National Dairy Products Corporation, New York, N.Y., a corporation of Delaware No Drawing. Application October 22, 1957
Serial No. 691,552

6 Claims. (Cl. 260—119)

This invention is concerned with a novel method for the treatment of casein. More particularly it is concerned with a method for lowering the viscosity of casein by treating it in a specified range of temperatures and pH values for certain lengths of time.

Casein is used industrially in the paint, paper and adhesive industries, and it has been so used for many years. In the past several years, however, other products, particularly synthetic resins, have increasingly gained popularity as a substitute for casein. One of the serious disadvantages of casein has been its high viscosity. In the past, the viscosity of casein has been lowered with various degrees of success by several methods different from that of the present invention. The present invention, however, provides a simple and economical method of lowering the viscosity of casein to as little as about one-fiftieth of its original value. Most surprisingly, this is accomplished without loss of adhesive strength. Furthermore, the product is recovered from the treatment in very high yield, and the treated product is less odoriferous than the untreated product.

According to the method of the present invention, the viscosity of casein is lowered most effectively by maintaining casein in an aqueous solution having a pH of from 7.0 to 8.5 at a temperature of from 55°–65° C. for a period of from 25 to 31 hours. It is preferred that the casein concentration in the solution be between about 10 and 14%. Values toward the lower end of this range are particularly preferred, since the avoidance of a dark colored product and the production of lower viscosity products are thereby favored. The addition of minor amounts, about 0.5 to 1.5% based on the weight of casein, of the disodium salt of ethylenediaminetetraacetic acid also tends to avoid dark colored product.

It is believed that the present reaction is an enzymatic one. One of the indications for this is the fact that certain types of pretreatment of the casein will render it unsuitable for the present process. In this regard, excessive heat, for example heating to about 100° C., will deactivate the enzyme system normally present in the casein which is believed to be responsible for the reaction of the present invention. The enzymatic activity may also be lowered by prolonged aging of the casein and by extraction with solvents which remove the enzyme. For this reason, the starting material for the process of the present invention is called "undeactivated casein," i.e. casein which contains the enzymatic activity naturally present therein.

Another indication of the enzymatic nature of the present process is the fact that casein which has been treated in a manner calculated to deactivate the enzymes normally present, for example heating to 100° C., when subjected to the process of the present invention, actually increases in viscosity. On the other hand, if a mixture containing equal parts by weight of such a pretreated deactivated casein and normal, undeactivated casein is treated by the process of this invention, there is a very significant reduction in viscosity. These observations are consistent with the belief that there is enough enzyme present in undeactivated casein to bring about the lowering of the viscosity of this material and also of the deactivated material.

Another indication of the enzymatic nature of the process of this invention is the fact that when soy protein is treated by the process of this invention, the resultant isolated product has a higher viscosity than the original protein. Since it is not possible to lower the viscosity of the soy protein under the same conditions that effectively lower the viscosity of casein, it is concluded that undeactivated casein must have some inherent property that causes this change to take place. This is consistent with the belief that an enzyme, for example some type of proteolytic enzyme, is present in the casein. When this enzyme is destroyed or removed, casein acts the same way as soy protein upon being subjected to the present process, i.e. its viscosity increases.

In summary therefore, it can be said that while there is no conclusive proof that the action here involved is an enzymatic one, such an explanation is consistent with all the known facts, and seems to be the most logical explanation. It is, therefore, all the more surprising that the reaction of the present invention is capable of yielding such good results, since the temperatures employed, namely from 55°–65° C., are considerably higher than those usually employed in enzymatic reactions.

In the past other workers have treated casein under conditions considerably different from those here employed. The products of such treatments have been markedly different from those obtained in the present invention. The products of the present invention, in addition to their very low viscosity and high adhesive strength, have the additional advantage of containing very low amounts of water soluble nitrogenous material. This is a particular advantage when the use of the material is such that a water resistant product is desired.

It is important that the above stated conditions be adhered to in order to obtain the desired product. Approximately 25 hours are required for the reaction to go to completion in very high yield. However, when times longer than 31 hours are employed, the casein beegins to hydrolyze, and this degradation of the molecule results in a considerable loss of adhesive strength. When temperatures below the range of 55°–65° C. are used, the product contains much more water soluble nitrogenous material, and its viscosity is not as low as that of the product of this invention. When temperatures above those in the range of 55°–65° C. are employed, the resulting product does not have the desired lowered viscosity, and viscosity will in fact, be higher under most conditions. In like manner, use of a pH below 7.0 will not result in the production of casein having such low viscosity as that of the present invention. The use of pH's above about 8.5 results in a falling off of adhesive strength, and also a considerable darkening of the reaction mixture.

The optimum conditions for the process of this invention were found to be a temperature of 60° C., a pH of 7.8, and a time of 29 hours.

In carrying out the process of the present invention, the alkali employed to solubilize the casein and obtain the desired pH may be any of the commonly used alkaline materials. The preferred material is ammonium hydroxide, since this results in a product of low ash content if the resulting product is isolated by spray drying. However, sodium hydroxide, potassium hydroxide, sodium carbonate, borax and other alkaline materials may also be employed. The important point is the pH, rather than the agent employed to obtain it.

The casein treatment reaction mixture may be used as is. However, it is preferred to separate the casein from the reaction mixture, for example by isoelectric precipitation with acid at pH 4.7, and subsequent filtration, or preferably by the spray drying method. The separated product has a much better storage life, and transportation costs are also lowered, since the weight of the water has been removed. Separation of the casein from the reaction mixture by isoelectric precipitation has the advantage of removing most of the soluble nitrogen products, while the spray drying method has the advantage of yielding a product of lower viscosity and lower acidity. The isolated reaction product is then reconstituted by mixing with water prior to use.

The method used in measuring viscosity was as follows: To a tared jar and stirrer 20 grams (on a total solids basis) of casein and 75 milliliters of distilled water were added. After the mixture had stood for approximately 20 minutes, 2 milliliters of concentrated ammonium hydroxide were added and the casein was brought into solution in a water bath at 140° F. The jar and its contents were weighed, and the net weight was brought to 100 grams by the addition of distilled water. The pH of the mixture was then checked and adjusted to 9.0 with concentrated ammonium hydroxide in cases where adjustment was needed. The jars were capped, placed in a water bath at 25° C., and kept there until the content reached this temperature. Viscosity measurements were then made using a Brookfield Viscometer, Model LVT.

Adhesive strength was determined by measuring the "pick number." A casein dispersion was prepared having the following concentration: 3.47 grams casein (dry weight), 0.24 gram borax, 0.24 milliliter concentrated ammonium hydroxide and 24.1 milliliters of distilled water. This mixture was stirred in a tared beaker and heated in a water bath at 140° F. until the casein was in solution. The net weight was then brought to 28.0 grams by the addition of distilled water. A clay dispersion having the following composition was then prepared: 60 grams of clay (Hydrosperse from J. N. Huler Corp.), 38 milliliters of distilled water, and 2 milliliters of concentrated ammonium hydroxide. These ingredients were mixed until a smooth dispersion was obtained. 29 grams of the clay dispersion was then added to 20 grams of the casein dispersion and mixed thoroughly. The mixture was then passed through an 80 mesh screen and coated on unsized paper by means of a Byrd applicator (0.0015 inch). The coated paper was then dried at 105° C. for 5 minutes. Dennison waxes, numbers 4 to 10, were then softened in a flame and applied to the coated paper. After standing for 15 minutes, the waxes were then pulled from the paper. The strength of the coating, or pick number, is determined by the highest number wax which does not remove the coating when it is pulled from the paper. This test was conducted in a constant humidity room.

The following examples are given solely for purposes of illustration and are not to be considered as limiting the invention to these embodiments. Many modifications will be apparent to those skilled in the art without departing from the spirit or scope of the invention.

EXAMPLE 1

40 pounds of casein and 250 pounds of water were added to a 50 gallon open kettle. 925 milliliters of concentrated ammonium hydroxide were added to this mixture to bring the casein into solution and adjust the pH to 7.5. The temperature of the reaction mixture was held at 60° C. for 29 hours. At the end of that time, the mixture was cooled to 35° C. by the addition of a volume of water equal to the volume of the reaction mixture. The modified casein was then isolated from the mixture by the precipitation which followed adjusting the pH to 4.7 by adding hydrochloric acid. The precipitate was filtered, and washed with 250 pounds of water. It was then dried in a force-draft oven at 140° F. The treated casein was reconstituted into a 20% solution, the viscosity of which was 1690 cps. Its pick number was 7, and it had an acidity of 8.9 ml. of 0.1 N NaOH per gram of casein. Viscosity of a 20% solution of the parent casein was 51,000 cps.

EXAMPLE 2

50 pounds of casein and 310 pounds of water were added to a 50 gallon open kettle. The material was allowed to mix for 25 minutes and then heated water was passed through the heat jacket of the kettle. During the warming period, 1385 milliliters of concentrated ammonium hydroxide was added. This brought the casein in solution and resulted in a final pH of 7.9. 115 grams of the disodium salt of ethylenediaminetetraacetic acid was added. The temperature of the reaction mixture was held at 60° C. At the end of 29 hours, 100 pounds of solution was taken from the kettle. This material was divided into two 50 pound portions, one of which was spray dried, and from the other, the casein was isolated by precipitation with hydrochloric acid at pH 4.7 A plate and frame filter press was used to separate the curd from the mother liquor and wash water. The solution which was spray dried was held at 40° F. overnight before the spray drying. The curds were dried in a force-draft oven at 120° F. The following table shows the results obtained.

*Analyses of spray-dried and precipitated low viscosity casein from Example 2*

| | Spray Dried Casein | Precipitated Casein |
|---|---|---|
| Moisture | 5.5% | 5.25%. |
| Viscosity of 20% Solution [1] | 5,500 cps | 7,100 cps. |
| Pick Number | 6+ | 6+. |
| pH (10% Soln.) | 6.2 | 4.7. |
| Acidity | 4.9 ml. of 0.1 N NaOH | 10.4 ml. of 0.1 N NaOH. |
| Soluble Nitrogen | 1.86 | 0.41%. |
| Total Nitrogen | 15.36% | 14.65%. |
| Formol Nitrogen | 1.96% | 1.29%. |

[1] Viscosity of 20% solution of the parent casein=85,000 cps.

EXAMPLE 3

To 150 grams of casein in 850 ml. of water, borax was added and the mixture was heated in a water bath at 140° F. until a solution was obtained. The pH of the mixture was then adjusted to 7.5 by the addition of more borax. The solution was placed in a water bath at 60° C. and maintained at that temperature for 28 hours. At the end of this time, the treated casein was isolated by isoelectric precipitation using 10% hydrochloric acid to adjust the pH to 4.7. The curds obtained were then washed twice with equal volumes of water and dried in a force-draft oven at 120° F. The pick value of the product was 7. The viscosity of a 20% solution of the resulting product was 6,600 cps.

EXAMPLE 4

The procedure of Example 3 was followed exactly except that sodium hydroxide was used instead of borax. The pick value of the resultant product was 7 and the viscosity of a 20% solution of the resulting product was 8,000 cps.

EXAMPLE 5

A 14% solution of casein was prepared using ammonium hydroxide as the solvent alkali and to adjust the pH to 7.8. The mixture was then heated at 60° C. for 29 hours after which it was diluted to twice its volume with cold water. When the temperature of the mix was 35° C., the modified casein was isolated by adjusting the pH to 4.7 and washing the resulting curd once with an equal volume of water. The washed curd was then dried at 120° F. in a forced draft oven. The viscosity of a 20% solution of the resulting compound was 900 cps, and its pick value was 7. The viscosity of a 20% solution of its parent casein was 51,000 cps, with a pick value of 7.

EXAMPLE 6

Using the same parent casein as Example 5 and altering the reaction temperature to 65° C. while keeping all other conditions as those in Example 5, a product was obtained whose 20% solution had a viscosity of 1280 cps and a pick value of 8.

What is claimed is:

1. A process for the preparation of casein having low viscosity and high adhesive strength, said process comprising maintaining undeactivated casein at a pH between 7.0 and 8.5 and at a temperature from 55°–65° C. for a period of from 25 to 31 hours.

2. A process as claimed in claim 1 wherein the treated casein is separated from the reaction mixture by precipitation with acid at a pH of approximately 4.7.

3. A process as claimed in claim 1 wherein the treated casein is separated from the reaction mixture by spray drying.

4. A process as claimed in claim 1 wherein the casein is present in the reaction mixture at a concentration of from 10 to 14%.

5. A process as claimed in claim 1 wherein about 0.5 to 1.5% based on the weight of casein of the disodium salt of ethylenediaminetetraacetic acid is added to the mixture.

6. A process for the preparation of casein having low viscosity and high adhesive strength, said process comprising maintaining undeactivated casein in an aqueous solution of pH 7.8 at a temperature of 60° C. for 29 hours.

References Cited in the file of this patent

Burnette et al., Ind. Eng. Chem., vol. 37, pp. 276–281 (1945).